United States Patent [19]

Takase et al.

[11] Patent Number: 5,029,685
[45] Date of Patent: Jul. 9, 1991

[54] OIL SEALING STRUCTURE FOR A HYDRAULIC DEVICE FOR AN AUTOMATIC TRANSMISSION

[75] Inventors: Isao Takase, Hazu; Haruki Takemoto, Chiryu; Mitsugu Tatsuta, Anjo; Shinobu Maseki, Kariya; Takenori Kano, Anjo, all of Japan

[73] Assignee: Aisin AW Co., Ltd., Anjo, Japan

[21] Appl. No.: 293,399

[22] Filed: Jan. 4, 1989

[30] Foreign Application Priority Data

Oct. 28, 1988 [JP] Japan .................. 63-273957

[51] Int. Cl.⁵ ............... F16D 21/04; F16D 25/10
[52] U.S. Cl. .................. 192/48.91; 192/85 AA; 192/87.11; 192/87.15; 277/3; 277/27
[58] Field of Search ............ 192/85 R, 85 AA, 87.1, 192/87.11, 87.14, 87.15, 48.8, 48.9, 48.91; 277/3, 27, 58

[56] References Cited

U.S. PATENT DOCUMENTS

| | | | |
|---|---|---|---|
| 2,764,269 | 9/1956 | Schjolin | 192/87.15 X |
| 3,105,582 | 10/1963 | Ziabicki | 192/87.15 X |
| 3,379,293 | 4/1968 | Hill | 192/85 AA |
| 3,844,393 | 10/1974 | Zaiser | 192/87.11 |
| 4,454,786 | 6/1984 | Stockton | 192/87.15 X |
| 4,924,982 | 5/1990 | Harada et al. | 192/87 X |

FOREIGN PATENT DOCUMENTS 62-141344  6/1987  Japan ................. 192/87.1

Primary Examiner—Richard Lorence
Attorney, Agent, or Firm—Kanesaka and Takeuchi

[57] ABSTRACT

Seal rings are set in oil grooves which are situated at both sides of two oil passages communicating two hydraulic actuators which operate oppositely. First and second seal rings oil-tightly seal between the first oil passage and sleeve, while third and fourth seal rings oil-tightly seal between the second oil passage and the sleeve. Accordingly even if oil flows oppositely in each of two oil passages due to the opposing motions of the two contiguous hydraulic actuators, not oil leakage occurs. Furthermore, a draining groove is situated between the oil grooves in which the second and third seal rings are installed.

5 Claims, 7 Drawing Sheets (a)

|     | C1 | C2 | C0 | C3 | B1 | B2 | B3 | F1 | F2 | F0 |
|-----|----|----|----|----|----|----|----|----|----|----|
| 1ST | ○  |    |    |    |    |    | (○)|    | ○  |    |
| 2ND | ○  |    |    |    | (○)| ○  |    | ○  | △  |    |
| 3RD | ✸  |    | ○  | ○  |    | ○  |    | △  | 〃 | ○  |
| 4TH |    |    | ○  | ○  | ○  | ○  |    | 〃 | 〃 | △  |
| REV |    | ○  |    |    |    |    | ○  |    |    |    |

REMARKS: ○ ENGAGING
(○) ENGAGING WHEN ENGINE BRAKE APPUED
✸ RELEASED BEFORE F0 BEING ENGAGED
△ OVER RUNNING (a)

(b)

OIL SEALING STRUCTURE FOR A HYDRAULIC DEVICE FOR AN AUTOMATIC TRANSMISSION

BACKGROUND OF THE INVENTION

1. Field of the Invention

The present invention relates to an automatic transmission to be mounted on an automobile especially to an automatic transmission having a forward four speed automatic transmission mechanism, in detail, relates to a sealing structure at a connecting part to a hydraulic actuator for a certain clutch operation.

2. Description of the Prior Art

Conventionally, the applicant of the present invention has proposed an automatic transmission wherein plural clutches connecting to plural rotation elements and hydraulic clutches to control the plural clutches are whole arranged at a back part of an automatic transmission mechanism. And in a clutch section in which these clutches are housed, a third clutch and a hydraulic actuator to control the third clutch are arranged. By this idea which requires slight modification from the previous structure it is possible to change a three speed automatic transmission mechanism into a four speed automatic transmission mechanism without causing any increase of the cost. (Refer to the Japanese Laid Open Patent No. Sho-62-141344)

A clutch section 47 has, as shown in FIG. 6, a first clutch C1 and a second clutch C2 and is arranged in a transaxle rear cover 17 at the back part of the automatic transmission mechanism. At the back edge of an input shaft 5, a sleeve 5a to enclose a center boss 17a of the cover 17 is arranged. A clutch drum 12 (a flange part) is integrally connected to the sleeve 5a. The clutch drum 12 has a movable member 7 which is spline coupled so that it can move axially. And the movable member 7 encloses a piston member 15 so that it can move axially. The movable member 7 and a cylinder made up by an inside surface of the clutch drum 12 make an oil chamber, and a hydraulic actuator 3 for the first clutch C1 is formed. The piston member 15 and a cylinder made up by the inside surface of the movable member 7 make an oil chamber, and a hydraulic actuator 4 for the second clutch C2 is formed. A spring 10 is arranged between the piston member 15 and a spring receiving member 16 fixed on the sleeve 5a by a snap ring. The spring 10 is a return spring which is used for both piston members 7 and 15 of the hydraulic actuators 3 and 4. Furthermore, the first clutch C1 is placed between a spline arranged on the inner surface of the peripheral section of the clutch drum 12 and a spline arranged on the axially elongated surface of the ring gear R1. The second clutch C2 is placed between a spline arranged on the inner surface of the peripheral section of the movable member 7 and a spline arranged on the outer surface of a hub 50a fixed on the hollow shaft 50.

Oil holes 5b and 5c are arranged in the sleeve 5a to be connected to the oil chambers of the hydraulic actuators 3 and 4. Oil passages 17b and 17c are arranged at the center boss 17a corresponding to the oil holes 5b and 5c. Oil grooves 9a and 9d are arranged so as to surround the oil passages 17b and 17c from both sides. Between the oil passages 17b and 17c an oil groove 9b is arranged. Seal rings 6a, 6b and 6d are installed in the oil grooves 9a, 9b and 9d respectively, which keep the space between the center boss 17a and the sleeve 5a oil-tight, so as not to cause oil leakage from the oil passages 17b and 17c when the hydraulic pressure is supplied to the hydraulic actuators 3 and 4.

In this automatic transmission the first clutch C1 and the second clutch C2 are arranged contiguously and the hydraulic actuators 3 and 4 operating the clutches C1 and C2 are also arranged contiguously. It occurs under certain circumstances that the operation of both clutches C1 and C2 works oppositely to each other, wherein the clutch C1 is kept engaged from the first speed mode to the third, and released at reverse running, but the clutch C2 is engaged at the reverse condition.

By this structure, for example, when the hydraulic pressure is supplied from the oil passage 17b to operate the hydraulic actuator 3, the seal ring 6b moves in the oil groove 9b by the pressure, as shown in FIG. 7 (a), and contacts the right wall of the groove 9b to prevent oil leakage from the groove 9b. When draining the hydraulic actuator 3 to release the first clutch C1 and supplying the hydraulic pressure to the hydraulic actuator 4 to engage the second clutch C2, a space is formed between the center boss 17a and the seal ring 6b because the hydraulic pressure drained from the hydraulic actuator 3 and the hydraulic pressure to be supplied to the hydraulic actuator 4 press the seal ring 6b from the both sides, as shown in FIG. 7(b). By this process a trouble that the oil-tightness is not kept between the hydraulic actuator 3 and the hydraulic actuator 4 occurs.

SUMMARY OF THE INVENTION

An object of the present invention is to provide, with due consideration to the drawbacks of such conventional devices, an automatic transmission whose hydraulic actuators have respective oil passages between which two seal rings are placed so that the both sides of the respective oil passages are sealed by respective seal rings.

In the present invention this object is achieved by the provision of, for example, referring to FIG. 1 and FIG. 2 (a), (b). a hydraulic device for an automatic transmission which has a first hydraulic actuator (3) and a second hydraulic actuator (4) which are situated close to each other and mounted on a rotating member (5) so that the actuator (3) and the actuator (4) engage a first clutch (C1) and a second clutch (C2); hydraulic pressure is supplied to hydraulic chambers of the first and second hydraulic actuators (3), (4) from a first oil passage (17b) and a second oil passage (17c) which are formed on a case (17) through oil holes (5b), (5c) which are formed on a sleeve (5a) enclosing the center boss (17a); based on the supply of hydraulic pressure, the first and the second clutches are engaged so that the rotating member (5) is connected to other rotating members (R1), (S). Considering the above arrangement of each member and element, the following is the remarkable features: oil grooves (9a), (9b), (9c), (9d) are constituted so as to situate the oil passage (17b) between the oil grooves (9a), (9b), and to situate the oil passage (17c) between the oil grooves (9c), (9d), further a first, second, third and fourth seal rings (6a), (6b), (6c), (6d) are installed in the respective oil grooves, and the first and the second seal rings (6a), (6b) keep sealing between the first oil passage (17b) and the sleeve (5a), while the third and the fourth seal rings (6c), (6d) keep sealing between the second oil passage (17c) and the sleeve (5a).

Furthermore, among the oil grooves (9b), (9c) where the second and the third seal rings are installed, a draining groove (17d) is constituted.

And as one example, the first clutch is a forward clutch (C1) which is engaged from the first speed to the direct coupling stage, while the second clutch is a reverse clutch which is engaged at reverse running.

Based on the above structure, when the first hydraulic actuator (3) operates to engage the first clutch (C1), the hydraulic pressure supplied through the oil passage (17b) is supplied to the first actuator (3) under the condition that the first and the second seal rings (6a), (6b) properly seal the area between the center boss (17a) and the sleeve (5a). And, when the second hydraulic actuator (4) operates to engage the second clutch (C2), the hydraulic pressure supplied through the oil passage (17c) is supplied to the second actuator (4) under the condition that the third and the fourth seal rings (6c), (6d) properly seal the area between the center boss (17a) and the sleeve (5a). Consequently no oil leakage occurs when hydraulic pressure is supplied to the first hydraulic actuator (3) and the second hydraulic actuator (4).

Even if oil leakage occurs when oil is supplied to the actuators (3) and (4), such leaked oil is caught by the draining groove (17d) without any side effect.

Still further, in case that the first clutch is the forward clutch (Cl) which is engaged from the first speed mode to the direct coupling mode, and the second clutch is the reverse clutch (C2) which is engaged at reverse running, for example, when the first hydraulic actuator (3) is drained, and at the same time, the second hydraulic actuator (4) is supplied to engage the reverse clutch (C2), or vice versa, the oil passage (17b) to the actuator (3), and the oil passage (17c) to the actuator (4) are securely sealed by the first and the second seal rings (6a), (6b), and, the third and the fourth seal rings (6c), (6d) respectively, so that no oil leakage occurs.

Incidentally, the numbers and letters shown in the parenthese are used for only for reference with reference to the drawing(s) and do not define the invention, which is referred in detail description of the preferred embodiment. And the same number may be named differently in the following description with respect to the previous description in which broader concepts are adopted.

BRIEF DESCRIPTION OF THE DRAWINGS

In the drawings:

FIG. 2 (b), is a view showing the state that hydraulic pressure works on the second clutch side;

FIG. 5 is a table of operation for the four speed automatic transmission mechanism;

FIG. 7(a) is a cross sectional view of a state of a seal ring of FIG. 6 when hydraulic pressure works on one actuator;

DETAILED DESCRIPTION OF THE PREFERRED EMBODIMENTS

An explanation of the embodiment shall be shown along with Figures.

Figure 4:
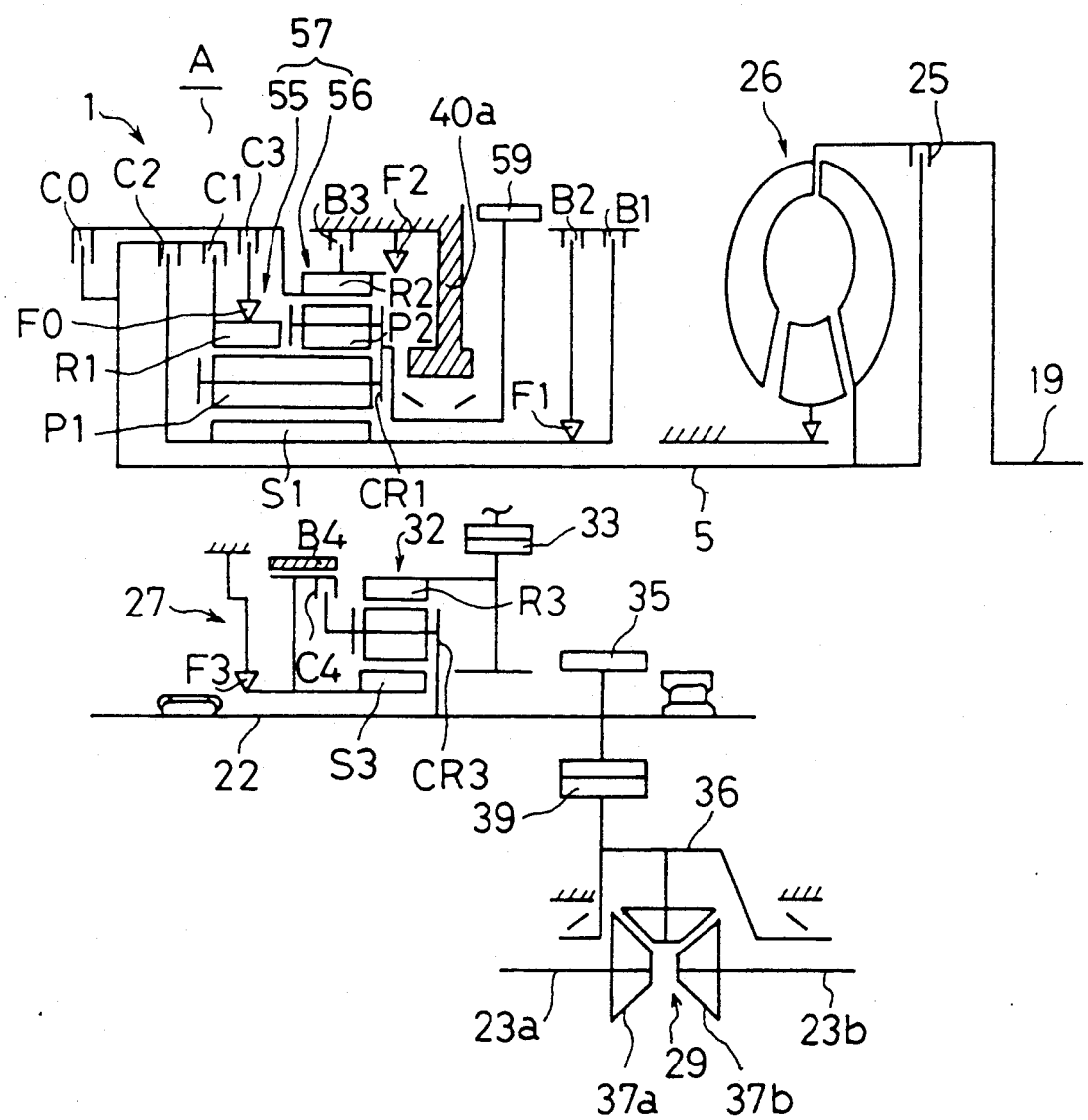
FIG. 4 is a schematic representation of the automatic transmission.
Figure 6:
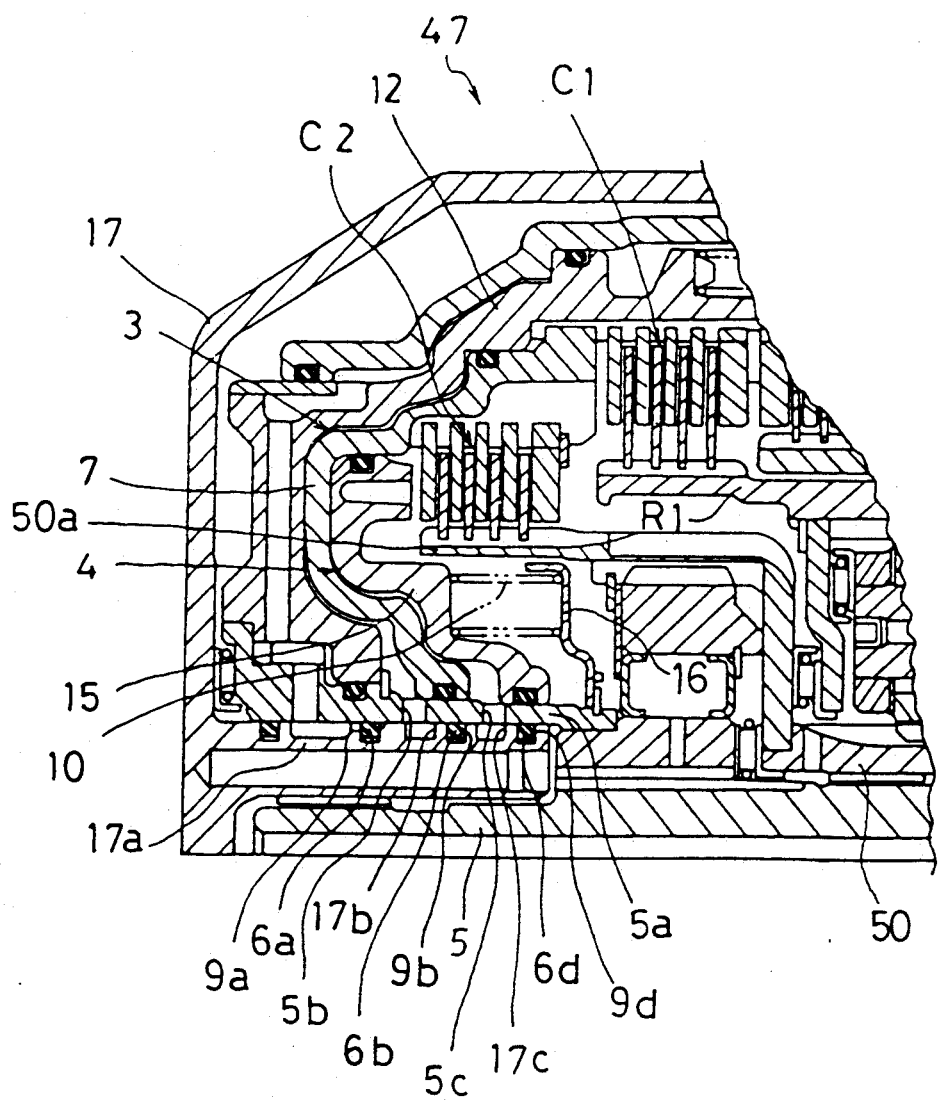
FIG. 6 is a cross sectional view of the hydraulic device for the automatic transmission which the applicant of the present invention has already proposed.
Figure 7:
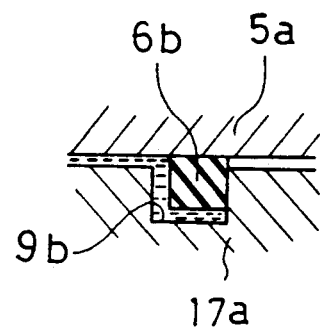
FIG. 7 (b) is a cross sectional view of a state of a seal ring of FIG. 6 when hydraulic pressure works on both oil passages for the both hydraulic actuators placed close.
Figure 7:
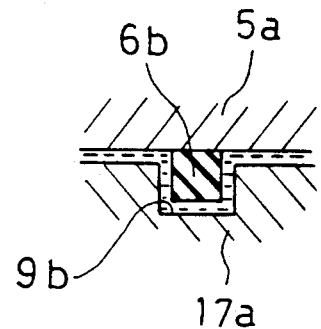

An explanation for an automatic transmission A employing the present invention shall now be shown along with FIG. 4. The automatic transmission A has three shafts; an input shaft 5 coaxially disposed relative to an engine crank shaft 19, a counter shaft 22 and a front axle shafts 23a, 23b. On the input shaft 5, a torque converter 26 having a lock-up clutch 25 and a forward four speed automatic transmission mechanism 1 is supported, on the counter shaft 22, an under drive mechanism 27 is supported, and on the front axle shafts 23a, 23b a front differential device 29 is supported.

The four speed automatic transmission mechanism 1 has a planetary gear unit 57 composed of a single planetary gear 55 and a dual planetary gear 56. In the planetary gear unit 57, the common sun gear S1 of the two planetary gears is integrally linked, and the common carrier CR1 is integrally linked. A pinion engaging with a sun gear S1 is composed of a long pinion P1. The input shaft 5 and a ring gear R1 (a small ring gear) of the single planetary gear 55 are connected through a first (forward) clutch C1. The input shaft 5 and a sun gear S1 are connected through a second (reverse) clutch C2. The sun gear S1 is restrained directly by a first brake B1 and is restrained in one-way rotation by a second brake B2 through a first one-way clutch F1. A ring gear R2 (a big ring gear) of the dual planetary gear 56 is restrained directly by a third brake B3 and is restrained at one-way rotation by a second one-way clutch F2. The carrier CR1 is connected to a counter drive gear 59 supported by a case bulkhead and this gear 59 is an output member for the four speed automatic transmission mechanism 1.

The clutches C1, C2, the brakes B1,B2, and the one-way clutches F1,F 2 are arranged here in the four speed automatic transmission mechanism 1 as in the same position as the three speed automatic transmission mechanism. However, besides the above structure, a third clutch CO connecting the input shaft 5 and the big ring gear R2 together, a fourth clutch C3 and a third one-way clutch F0 are provided between the big ring gear R2 and the small ring gear R1.

The under drive mechanism 27 has a single planetary gear 32, whose carrier CR3 and a sun gear S3 are connected through a fifth (direct) clutch C4. The sun gear S3 is restrained directly by a fourth (under drive) brake B4 and is restrained by one-way clutch F3. The ring gear R3 is connected to a counter driven gear 33 which is an input member of the under drive mechanism 27, and engaged with the counter drive gear 59. The carrier CR3 is connected to the counter shaft 22 on which a reduction gear 35, which is an output member of the under drive mechanism 27 is fixed.

The front differential device 29 has a differential carrier 36 and left and right side gears 37a, 37b. A ring gear 39 is fixed on the differential carrier 36 which is a gear mount case. The ring gear 39 engages with the reduction gear 35 to compose a final reduction mechanism, where the left and right side gears 37a and 37b are respectively connected to the left and the right front axle shafts 23a and 23b.

Furthermore, the operation of the four speed automatic transmission mechanism 1 shall be explained along with FIG. 5. The rotation of the engine crank 19 is transmitted to the input shaft 5 through the torque convertor or the lock-up clutch 25. And at the first speed mode of D range, the first clutch C1 is engaged. At this stage, the rotation of the input shaft 5 is transmitted to the small ring gear R1 through the first clutch C1, and the rotation of the big ring gear R2 is stopped by the second one-way clutch F2, so that by idling the sun gear S1 reversely, the rotation speed of the carrier CR1 is reduced considerably in the normal rotative direction. And this rotation is taken out from the counter drive gear 59.

At the second speed mode of D range, not only the first clutch C1 engages but also the second brake B2 engages. Then the rotation of the sun gear S1 is restrained by the operation of the first one-way clutch F1 based on the brake B2. So by the rotation from the input shaft 5 to the small ring gear R1, the big ring gear R2 idles in the positive direction, and the carrier CR1 reduces the rotation speed in positive direction. This reduced rotation is taken out from the counter drive gear 59 as the second speed. By the above operation when the speed mode is changed from the first to the second, the shift shock caused by the gear changes does not occur and shifting is done smoothly.

At the third speed mode of D range, the third clutch C0 and the fourth clutch C3 are engaged in addition to the second speed mode. Then the rotation is transmitted from the input shaft 5 to the small ring gear R1 through the first clutch C1, and then transmitted to the big ring gear R2 through the third clutch C3. By this operation the planetary gear unit 57 rotates together and the direct rotation is transmitted to the counter drive gear 59. When the speed mode is changed from the second to the third, the first one-way clutch F1 is changed from the locked mode to the over-run mode so that the shift shock caused by the gear changes does not occur and shifting is done smoothly.

At the third speed mode, the third clutch C0 and the fourth clutch C3 are engaged at the same time, and the rotation of the input shaft 5 is transmitted to the small ring gear R1 even by the transmission passage running through the third clutch C0, the fourth clutch C3 and the third one-way clutch F0.

At the up-shift at D range from the third speed to the fourth speed, the first clutch C1 releases at first. At this stage, the rotation is transmitted to the small ring gear R1 mainly by the transmission passage through the third clutch C0, the fourth clutch C3 and the third one-way clutch F0. At this state, the first brake B1 operates. Then the sun gear S1 is restrained even to the reverse torque, so that the rotation of the big ring gear R2 transmitted from the input shaft 5 through the third clutch C0, which over-runs the one-way clutch F0 and idling the small ring gear R1 at a high speed, is taken out from he carrier CR1 as the over drive rotation. In this process, the first clutch C1 is released and shifting is conducted under the control of the operation of the third one-way clutch F0, the shift shock caused by the gear changes does not occur and shifting is done smoothly.

Furthermore, under the operation of the engine brake such as the third range, the second range and the first range, the third brake B3 operates to stop the big ring gear R2 even to the reverse torque, and the first brake B1 operates to stop the sun gear S1 even to the reverse torque at the second speed mode.

At the reverse range, the second clutch C2 is engaged and the third brake B3 operates. At this stage, the rotation of the input shaft 5 is transmitted to the sun gear S1 through the second clutch C2. The big ring gear R2 is fixed by the third brake B3, so that the carrier CR1 rotates reversely with rotating the small ring gear R1 reversely, and the reverse rotation of this carrier is taken out from the counter drive gear 59.

At the under drive mechanism 27, the rotation from the counter driven gear 33 is taken out from the ring gear R3 to the carrier CR3 as reduced (under drive) rotation, when the sun gear S3 is stopped by the fourth brake B4 and (or) the fourth one-way clutch F3. And when the fourth brake B4 is released and the fifth clutch C4 is engaged, the carrier CR3 and the sun gear S3 work together, so that the direct rotation is taken out from the counter shaft 22.

And in the automatic transmission A, the forward four speed modes of the automatic transmission mechanism 1 and the reduction speed mode and the direct speed mode of the under drive mechanism 27 are combined at a required time, so that a certain transmission speed mode can be obtained and this rotation is transmitted to the front differential device 29 through the reduction gear 35 and the ring gear 39, and also transmitted to left and right axle shaft 23a, 23b.

Next, an explanation will be given to the automatic transmission A by means of a specific embodiment with reference to FIG. 3.

The automatic transmission A has an integral casing having a transaxle case 40, a transaxle housing 41 and a rear cover 17. The input shaft 5, the counter shaft 22 and a ring gear mount case 36 which form a differential carrier of a front differential device 29 are free rotationally supported in the above integral casing On the input shaft 5, a torque converter 26 having the lock-up clutch 25, and the four speed automatic transmission mechanism 1 are arranged; and on the counter shaft 22, the under drive mechanism 27 is arranged. And in the transaxle case 40, a valve body 44 covered with a side cover 48 is arranged.

In the four speed automatic transmission mechanism 1, a brake section 43, an output section 45, a planetary gear unit 57 and a clutch section 47 are arranged in order from the engine crank shaft 19. Between the brake section 43 and the torque converter 26, an oil pump 49 is arranged and a hollow shaft 50 encloses the input shaft 5, by which the shaft 50 is supported.

The planetary gear unit 57 is composed of the single planetary gear 55 and the dual planetary gear 56 (refer to FIG. 4). The single planetary gear 55 is composed of the sun gear S1 made on the hollow shaft 50, the ring gear R1, the pinion P1 meshing with the ring gear R1 and the sun gear S1, and the carrier CR1 supporting the pinion P1. The dual planetary gear 56 is composed of the sun gear S1 made on the hollow shaft 50, the ring gear R2, the first pinion P1 meshing with the sun gear S1, the second pinion P2 meshing with the ring gear R2, and the carrier CR1 supporting the first and second pinions P1, P2 to mesh with the pinions P1 and P2 each other. And in both of these planetary gears 55, 56, the sun gear is made up by a mono gear, having same number of gear teeth, and constituted on the hollow shaft 50, the carrier CR1 is composed as one body, and the pinion P1 is a long pinion which is integrally constituted.

Furthermore, in the brake section 43, a one-way clutch F1, a second brake B1 composed of a multiple plate brake and a second brake B2 composed of the multiple plate brake are arranged in order from the inside to the outside. The first one-way clutch F1 has its inner race engaged with the edge of the hollow shaft 50 and its outer race fixed to a hub for the second brake.

On the front (engine) side of the inner rase of the one-way clutch, a hub for the first brake is fixed. At the back side of an oil pump cover of the oil pump 49, a hydraulic actuator 60 for the first brake and a hydraulic actuator 51 for the second brake are arranged from the inside.

The output section 45 has the counter drive gear 59 placed in the middle of the four speed automatic transmission mechanism. This counter drive gear 59 is free rotationally supported on a bulkhead 40a of the trans axle case 40 through a duble tapered bearing 53, and has its boss part connected to the carrier CR1 of the planetary gear unit 57. Furthermore, the outer race of the bearing 53 is spline coupled to the inside surface of the case bulkhead 40a. And on the elongated outer surface of the outer race, the second one-way clutch F2 is arranged. Between the ring gear R2 and the axle case 40 a third brake B3 is arranged.

Figure 1:
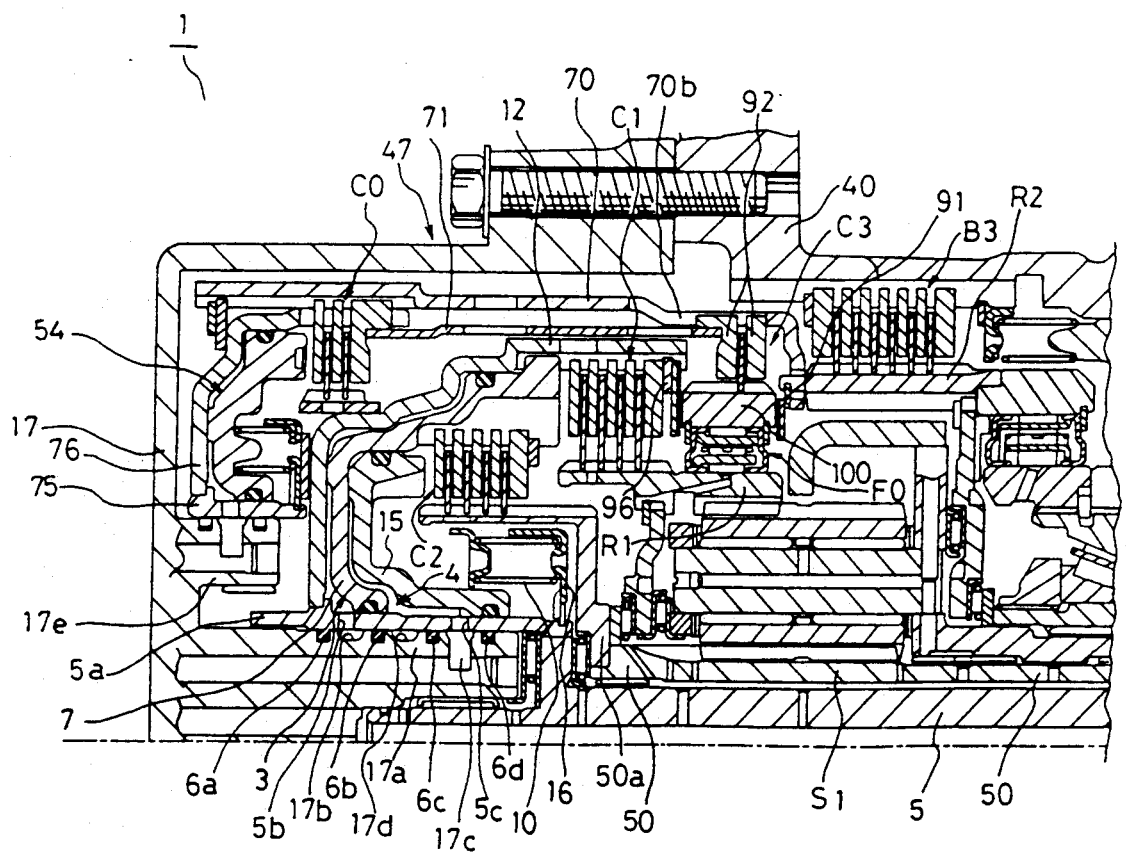
FIG. 1 is a cross sectional view of the main part of the hydraulic device for an automatic transmission related to the present invention.

As shown in detail in FIG. 1, the clutch section 47 has the first (forward) clutch and the second (reverse) clutch and is arranged in the transaxle rear cover 17 placed behind the four speed automatic transmission mechanism 1. The back edge of the input shaft 5 is a sleeve 5a and encloses a center boss 17a of the rear cover 17. A clutch drum 12 is connected to the sleeve 5a. Furthermore, this clutch drum 12 encloses a movable member 7 by a spline so that it can be moved axially. And the movable member 7 encloses a piston member 15. The movable member 7 and a cylinder made up from the inside of the clutch drum 12 compose an oil chamber so that a hydraulic actuator 3 for the first clutch C1 is formed, while the piston member 15 and a cylinder made up from the inside of the movable member 7 compose an oil chamber so that a hydraulic actuator 4 for the second clutch C2 is formed.

Between the piston member 15 and a spring holding member 16 which is fixed on the sleeve 5a by a snap ring, a spring 10 is arranged and this spring 10 is a return spring for both the piston members 7 and 15 of the actuators 3 and 4. The first clutch C1 is arranged between a spline made on the outside surface of the clutch drum 12 and a spline made on the axially elongaged surface of the ring gear R1. The second clutch C2 is arranged between a spline made on the inside surface of the movable member 7 and a spline made on the outside surface of a hub 50a fixed on the hollow shaft 50.

Figure 2:
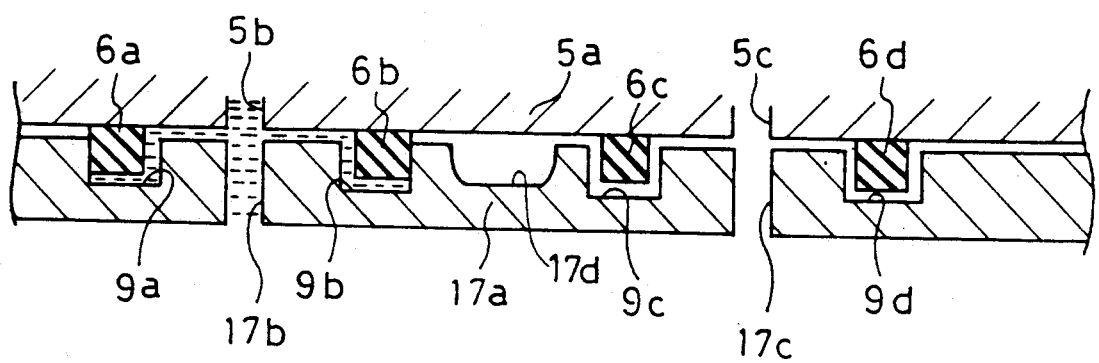
FIG. 2 (a) is a view showing the state that hydraulic pressure works on the first clutch side.
Figure 2:
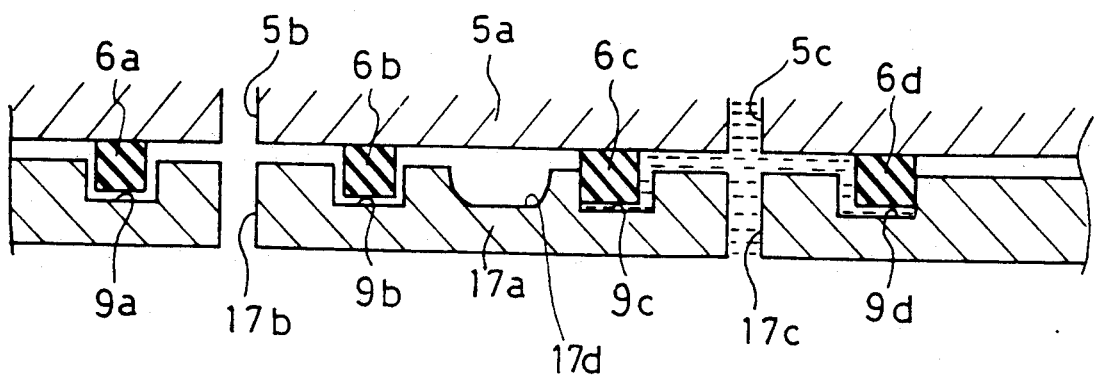

On the sleeve 5a, oil holes 5b and 5c are formed to respond to the hydraulic actuator 3 of the first clutch C1 and the hydraulic actuator 4 of the second clutch C2. Oil passages 17b and 17c are arranged in the center boss 17a to respond to the above oil holes 5b and 5c. Furthermore between the oil passages 17b and 17c, a draining groove 17d is arranged. This draining groove 17d is structured so as not to exert influence on other parts even if oil leaks from oil grooves 9b and 9c. Oil grooves 9a and 9b (reference to FIG. 2) are arranged in the center boss 17a to put the oil passage 17b therebetween. Oil grooves 9c and 9d are arranged also in the middle boss 17a to put the oil passage 17c therebetween. Seal rings 6a, 6b, 6c and 6d are set in the oil grooves 9a, 9b, 9c and 9d. Therefore, at the time of supply and drain of oil to the hydraulic actuator 3 for the first clutch, the oil passage 17b and the sleeve 5b are kept oil-tightly by the seal rings 6a, 6b, while at the time of supply and drain of oil to the hydraulic actuator 4 for the second clutch, the oil passage 17c and the sleeve 5a are kept oil-tightly by the seal rings 6c, 6d. So if there is only one seal ring to part the oil passages 17b and 17c, when supplying the hydraulic pressure to the hydraulic actuator 4 while the hydraulic actuator 3 is drained, the seal ring floats in the midst of the grooves to cause oil leakage. But in this embodiment no oil leaks from the oil passages 17b and 17c.

This four speed automatic transmission 1 has following devices besides the above three speed transmission mechanism and the common members A sleeve member 75 encloses a circular boss 17e of the rear cover 17. A flange member 76 is fixed on this sleeve member 75 to compose a cylinder of a hydraulic actuator 54 for the third clutch CO. On another edge part of the drum member 70 arranged at the out side of the flange member 76 of the hydraulic actuator 54, a groove 70b is arranged. On the groove 70b a separator plate 92 to compose the fourth clutch C3 is engaged. And a circular tube 71 which composes a tension member is installed parallel to the inside surface of the drum member 70 and placed between a separate plate for the third clutch Co and the separate plate 92 for the fourth clutch C3. And an outer race 100 for the third one-way clutch F0 is arranged between the snap ring 96 to hold the first clutch C1 and the snap ring 91 to hold the drum members.

Figure 3:
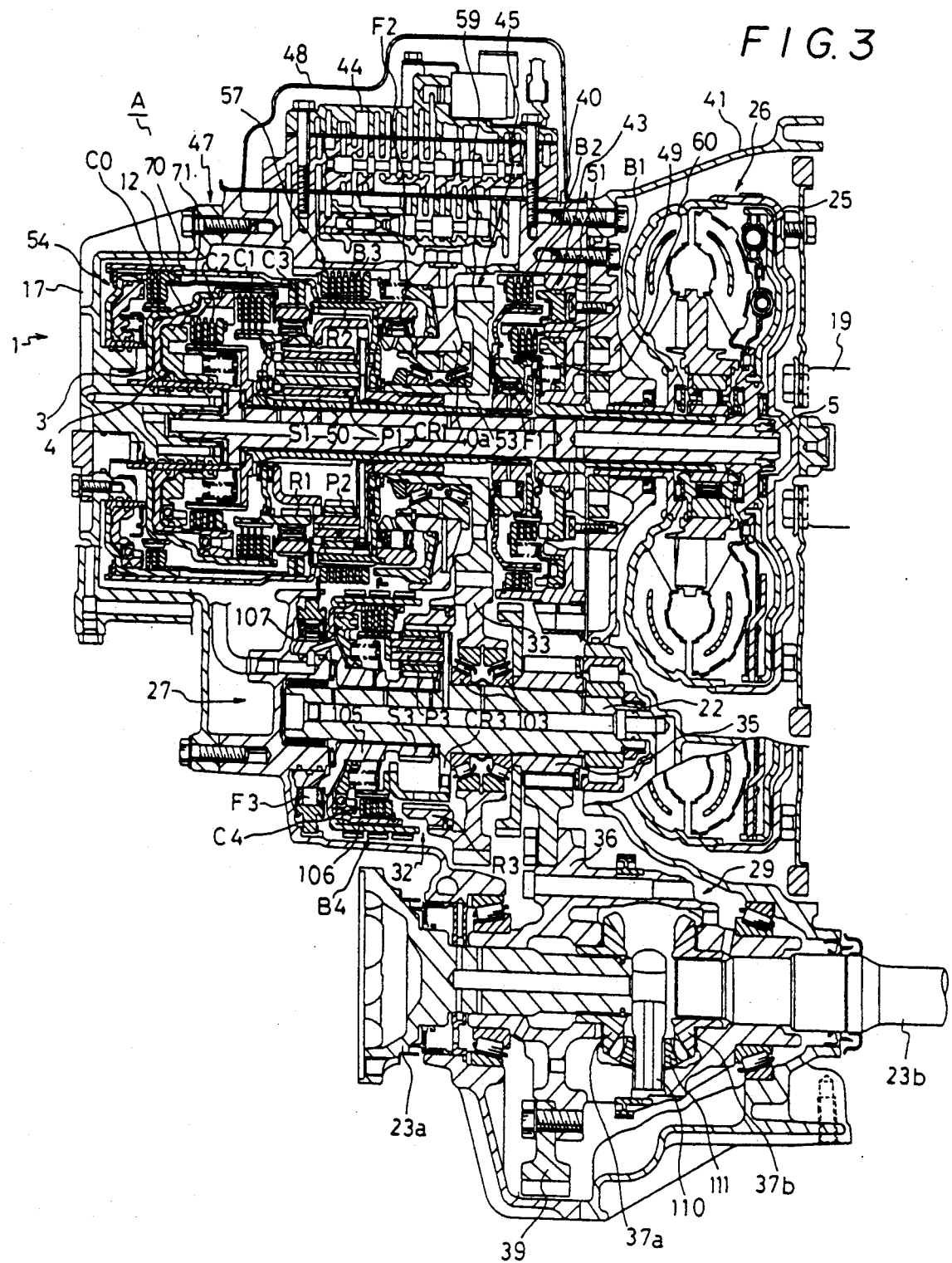
FIG. 3 is a cross sectional view of the whole automatic transmission.

The under drive mechanism 27, as shown in the FIG. 3, has one single planetary gear 32. Furthermore, a counter driven gear 33 is free rotationally supported on the counter shaft 22 through a bearing 103. A reduction gear 35 is also fixed on the counter shaft 22. A ring gear R3 of the planetary gear 32 is connected to the counter driven gear 33. The carrier CR3 supporting the pinion P3 is constituted by bulging the counter shaft 22 radially. Furthermore, the sun gear S3 is arranged on the hub 105 free rotationally supported on the counter shaft 22. The fourth brake B4 made of a band brake is placed at the drum 106 which is fixed on the outside surface of the hub 105. Between the inside surface of the drum 106 and a hub fixed on the carrier CR3 a fifth clutch C4 is arranged. Furthermore, a piston is enclosed in the hub 105 which is located next to the clutch C4, and a hydraulic actuator 107 for the fifth clutch C4 is formed. And, between the elongated part of the hub 105 and the case 40, the fourth one-way clutch F3 is installed.

The front differential device 29 has a ring gear mount case 36 to be the differential carrier. This case 36 is free rotationally supported by the housing 41 and the case 40 through the bearing. Furthermore, on the mount case 36 a big diameter ring gear 39 which engages with the reduction gear 35 is fixed, and inside the ring gear 39 a pinion gear 111 is free rotationally supported by the pinion shaft 110 and also left and right side gears 37a, 37b engaging the gear 111 are free rotationally supported. The left and right front axles shafts 23a and 23b are respectively enclosed and connected to the side gears 37a and 37b.

The explanation for the operation of the above embodiment shall now be shown in detail.

At the forward first speed mode, the hydraulic pressure is supplied to the hydraulic actuator 3 through the oil passage arranged in the rear cover 17. Then the movable member 7 moves against the spring 10 by using the clutch drum 12 as a cylinder, which engages the first clutch C1. At this state, the rotation of the input shaft 5 is transmitted to the small ring gear R1 through the clutch drum 12 and the first clutch C1. At the same time the big ring gear R2 is restrained by the second one-way clutch F2, the first speed rotation is taken out from the carrier CR1. When the engine brake is working, the third brake B3 operates and the big ring gear R2 is stopped directly. This rotation, as has been explained along with FIG. 4, is transmitted to the under drive mechanism 27 through the counter drive gear 59 and the counter driven gear 33, also to the front differential device 29 through the reduction gear 35 and the ring gear 39 and to the left and right front axle shafts 23a and 23b.

And at the forward second speed mode, the hydraulic pressure is supplied to the hydraulic actuator 51 to operate the second brake B2. Then the sun gear S1 is stopped through the one-way clutch F1 and the hollow shaft 50. The rotation of the small ring gear R1 through the first clutch C1 is taken out from the carrier CR1 as the second speed as explained before. When it is necessary to work the engine brake at the second speed mode, the hydraulic pressure is supplied to the hydraulic actuator 60 and the sun gear S1 is fixed directly.

At the forward third speed mode, besides the hydraulic supply to the hydraulic actuator 3 for the first clutch C1, the hydraulic pressure is supplied to the hydraulic actuator 54 through the oil passages arranged in the tubular boss 17e of the rear cover 17 and the third clutch C0 is engaged. By this process the rotation of the input shaft 5 is transmitted to the big ring gear R2. At the same time with the rotation of the small ring gear R1 through the first clutch, the direct rotation, which rotates the elements of the planetary gear unit 57 together, is taken out from the carrier CR1.

Furthermore, before the up-shift to the forward fourth speed mode, the first clutch C1 is released by draining the hydraulic actuator 3. At this state, the rotation to the small ring gear R1 is mainly transmitted through the third clutch C0, the fourth clutch C4 and the third one-way clutch F0. At this state, the hydraulic pressure is supplied to the hydraulic actuator 60 and operates the first brake B1. When the sun gear S1 is stopped, the rotation of the input shaft 5 is transmitted to the big ring gear R2 through the third clutch C0 and the drum member 70. This rotation over-run the one-way clutch F0 and runs the small ring gear R1 at high speed, so that the over-drive rotation is taken out from the carrier CR1.

At reverse range state, the hydraulic pressure is supplied to the hydraulic actuator 4 through the oil passage 17c arranged in the rear cover 17, which moves the piston member 15. The piston member 15 moves against the spring 10 to engage the second clutch C2 as the movable member 17 being a cylinder and to operate the third brake B3. At this state, the rotation of the input shaft 5 is transmitted through the clutch drum 12, the movable member 7, the second clutch C2 and so on. By the stopping of the big ring gear R2 based on the third brake B3, the reverse rotation is taken out from the carrier CR1.

When the speed mode is swiftly changed from the forward running mode to the reverse running mode, the hydraulic actuator 3 is drained to release the first clutch C1, subsequently the hydraulic pressure is supplied to the hydraulic actuator 4 quickly to engage the second clutch C2. At this state, the spaces between the oil passage 17b (to the hydraulic actuator 3 for the first clutch) and the sleeve 5a, and the oil passage 17c (to the hydraulic actuator 4 for the second clutch) and the sleeve 5a are sealed oil-tightly by the pair of seal rings: the first and second seal rings 6a and 6b, and, the third and fourth seal rings 6c and 6d respectively. So the draining hydraulic pressure which works on the side of the oil passage 17b is sealed by the seal rings 6a and 6b independently from the oil passage 17c. While the hydraulic pressure working on the oil passage 17c is sealed by the seal rings 6c and 6d independently from the side of the oil passage 17b. Then no oil leaks from the both sides of the hydraulic actuator 3 and the hydraulic actuator 4. When, on the contrary, the second clutch C2 is released and the first clutch C1 is engaged in order to change the speed mode from the reverse running to the forward running, no oil leaks from the both sides of the hydraulic actuator 3 and the hydraulic actuator 4, as explained before.

TECHNICAL ADVANTAGES OF THE INVENTION

As explained above, the seal rings (6a), (6b), (6c) and (6d) are set in the oil grooves (9a), (9b), (9c) and (9d) to seal between the first oil passage (17b) and the sleeve (5a), and, the second oil passage (17c) and the sleeve (5a) oil-tightly and respectively, so that even when the first hydraulic actuator (3) operates to engage or release the first clutch (C1), and even when the second hydraulic actuator (4) operates to engage or release the second clutch (C2), the first and second oil passages (17b), (17c) are properly sealed, and consequently malfunction on the hydraulic actuators (3), (4) are prevented.

Furthermore, in case that the draining groove (17d) is arranged between the oil grooves (9b) and (9c), oil can be absorbed in the draining groove (17d) instantly without having influence on other parts even if oil leaks when the hydraulic pressure is supplied to the first and second hydraulic actuators (3) and (4).

In case that the first clutch is the forward clutch (C1) which is engaged from the first speed mode to the direct drive mode, and the second clutch is the reverse clutch (C2) which engages at the reverse running, it is possible to prevent the occurrence of the oil leakage and greatly improve the reliability of this device, because the first oil passage (17b) and the second oil passage (17c) are kept oil-tight respectively by the first to the fourth seal rings (6a), (6b), (6c) and (6d) even when, for example, changing the speed mode quickly from the forward running to the reverse running so that the hydraulic actuator (3) is drained in order to release the forward clutch (C1) and then the hydraulic pressure is supplied to the second hydraulic actuator (4) in order to engage the reverse clutch (C2).

What is claimed is:

1. An oil sealing structure for an automatic transmission including a rotating member having at least one first oil hole and at least one second oil hole, a forward clutch indirectly connected to the rotating member, a first hydraulic actuator for the forward clutch installed on the rotating member, said first oil hole communicating with the first hydraulic actuator, a reverse clutch indirectly connected to the rotating member, and a second hydraulic actuator for the reverse clutch installed on the rotating member, said second oil hole communicating with the second hydraulic actuator, said oil sealing structure comprising:

a case for rotationally supporting the rotating member, said case including a first oil passage communicating with the first oil hole, a second oil passage communicating with the second oil hole, a first pair of annular oil grooves between which the first oil passage is situated, a second pair of annular oil grooves between which the second oil passage is situated, first and second seal rings respectively situated in the first pair of annular oil grooves so that the case and rotating member are sealed to allow oil to flow through the first oil passage and first oil hole without leakage, third and fourth seal rings respectively situated in the second pair of annular oil grooves so that the case and rotating member are sealed to allow oil to flow through the second oil passage and second oil hole without leakage, and a draining groove situated between one oil groove of the first pair of annular oil grooves and one oil groove of the second pair of annular oil grooves, which are located adjacent to each other.

2. An oil sealing structure according to claim 1, wherein said case includes a rear cover for covering a rear portion of the automatic transmission, and a boss section in which the first and second oil passages are formed.

3. An oil sealing structure according to claim 2, wherein said rotating member includes a sleeve for covering the boss section, and said automatic transmission includes a drum fixed to the sleeve, said forward and reverse clutches and first and second hydraulic actuators being retained inside the drum.

4. An oil sealing structure according to claim 3, wherein said automatic transmission includes an input shaft with an end portion, said end portion of the input shaft being situated inside the boss section so that the input shaft is supported by the boss section, said sleeve covering the boss section and engaging the input shaft.

5. An oil sealing structure according to claim 3, wherein said first and second hydraulic actuators include pistons respectively, said pistons for the first and second hydraulic actuators being arranged inside the drum to fit one over the other.

* * * * *